United States Patent
Rudolf et al.

(10) Patent No.: US 6,980,562 B2
(45) Date of Patent: Dec. 27, 2005

(54) METHOD OF RANDOM ACCESS TO A RESOURCE SHARED BETWEEN SEVERAL USERS

(75) Inventors: Marian Rudolf, Rennes (FR); Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 705 days.

(21) Appl. No.: 09/736,148

(22) Filed: Dec. 15, 2000

(65) Prior Publication Data

US 2002/0024968 A1 Feb. 28, 2002

(30) Foreign Application Priority Data

Dec. 30, 1999 (FR) .............................. 99 16850

(51) Int. Cl.⁷ .............................................. H04L 12/43
(52) U.S. Cl. ...................... 370/462; 370/447; 370/458
(58) Field of Search ................................ 370/337, 338, 370/348, 447, 458, 462, 442, 443, 445, 448

(56) References Cited

U.S. PATENT DOCUMENTS

| | | | | |
|---|---|---|---|---|
| 4,979,168 A | * | 12/1990 | Courtois et al. ............ 370/349 |
| 5,012,469 A | * | 4/1991 | Sardana ....................... 370/322 |
| 5,278,833 A | * | 1/1994 | Crisler et al. ................ 370/348 |
| 6,240,083 B1 | * | 5/2001 | Wright et al. ............... 370/348 |
| 6,529,520 B1 | * | 3/2003 | Lee et al. .................... 370/442 |
| 6,680,950 B1 | * | 1/2004 | Nagata et al. ............... 370/461 |
| 6,721,331 B1 | * | 4/2004 | Agrawal et al. ............ 370/448 |

FOREIGN PATENT DOCUMENTS

| | | |
|---|---|---|
| WO | WO 96/31077 | 10/1996 |
| WO | WO 99/00931 | 1/1999 |

* cited by examiner

Primary Examiner—Afsar Qureshi
(74) Attorney, Agent, or Firm—Oblon, Spivak, McClelland, Maier & Neustadt, P.C.

(57) ABSTRACT

A method of random access by a user to a resource shared according to a protocol of the ALOHA type. If the instant of transmission of a data packet for a user that is supplied by at least one first random variable conflicts with time ranges of access to the resource that have been the object of prior booking, the random variable is temporarily modified into a modified second random variable of the same mean and greater variance as the at least one first random variable.

12 Claims, 5 Drawing Sheets

METHOD OF RANDOM ACCESS TO A RESOURCE SHARED BETWEEN SEVERAL USERS

This invention relates to a method of random access to a resource shared between several users. More especially, the invention relates to an access method of the ALOHA type and preferably of the discrete ALOHA type (also called Slotted ALOHA).

When several users share the same resource (for instance local area network, radio or satellite frequency bands, frames for example), it is necessary to define rules giving to each user access to the resource under conditions best compatible with his transmission requirements. There are two large families of access methods allowing such sharing: access methods with bookings in which the resource is the object of prior allocation according to the requirements of each user, and random access methods in which each user transmits as he wishes without previous consultation with the others, access conflicts being managed after the event.

FIG. 1 illustrates an example of a system in which a transmission channel (RACH) is shared between several users $U_1, U_2 \ldots U_N$ transmitting data packets to a system S according to a method of random access. When the system receives a data packet, it checks its integrity, (for example with an error detection method) and sends back in the affirmative an acknowledgement on a control channel (CC).

FIG. 2 gives a simplified timing chart of the dialogue between a user $U_i$ and system S. The user $U_i$ sends a packet at instant $t_i$. The integrity of the data is checked on receipt by system S and, in the affirmative, an acknowledgement is sent back by the system. It is received by user $U_i$ at a time $T_{ACK}$ after sending. On the other hand, if the packet (sent at instant $t_3$) is detected as corrupt by system S, because, for example, it has been subjected to a collision with a packet sent by another user, the absence of an acknowledgement is detected by the user at the end of time $T_{ACK}$ and the packet is sent again after a time $T_{Retransmit}$.

Other techniques which allow checking of transmission integrity are also known, especially the CSMA/CD technique (Carrier Sense Multiple Access with Collision Detection) which does not require an acknowledgement on a control channel. According to this technique, the user listens to the shared channel before transmitting and continues to listen during transmission. If there is a collision, the transmission of the packet is aborted and a new transmission is attempted later. This technique requires, on the other hand, an interference detection circuit for each user.

A well known method of random access to a shared resource is the ALOHA protocol.

According to a first version which will be called purely random ALOHA, each user sends as he wishes and at any transmission instant. A transmission sequence according to this protocol is illustrated in FIG. 3. When the packets sent by any two users $U_i$ and $U_j$ overlap, there is a collision (C) and the packets involved are sent again later after respective delays $T_{Ri}$ and $T_{Rj}$. In order to avoid a repetition of the collisions and therefore a blocking situation (a phenomenon known under the name of dynamic persistence), the transmission delays are chosen distinct for the various users. More exactly, each user has available his own random variable supplying this delay, these random variables being chosen so as to have different means.

In a second version called discrete ALOHA, transmission intervals (slots) are repeated periodically and the users can send as they wish provided that they respect the transmission intervals. The users of the shared resource must synchronise their sending instants. It is shown that this constraint makes it possible to obtain a transmission capacity which is double that of the purely random ALOHA protocol. A transmission sequence according to the discrete ALOHA protocol is illustrated in FIG. 4. A collision (C) on channel RACH takes place when two users send during the same interval. The collision is then complete and the collided packets must be sent again later. As in the previous case, the transmission delays are supplied by random variables with distinct means, and this in order to reduce dynamic persistence.

The random variables must also be at discrete values in $(k^*T_{rec})$ where k is a whole and $T_{rec}$ the period of recurrence of the transmission intervals in order that a retransmission coincides with an interval.

FIG. 5 represents a flow chart of the operation of a user having access to a shared resource according to the ALOHA protocol. Starting from its idle state (50), the user tests periodically (51) whether a data packet is to be transmitted. If this is the case, a first random variable supplies (52) a transmission instant $T_{Transmit}$ (with values in $(k^*T_{rec})$ in the case of discrete ALOHA.) The user sends (53) at instant $T_{Transmit}$ the data packet on the shared channel and waits for the acknowledgement. If it is received (54), the user goes back to its idle state. If not, it is concluded (54) that there has been a collision and a second random variable supplies (55) a delay period $T_{Retransmit}$ (also with values in $(k^*T_{rec})$ in the case of discrete ALOHA) at the end of which a new attempt to transmit (56) will be made.

The policy of random access to a shared resource can be organised along the lines of booking and this for different reasons.

First of all, it is possible that users have to carry out parallel operations when transmitting. In some cases, for example when the user has to use his transmission/reception resources to carry out parameter measurements on the network or other access networks, these operations exclude access to the shared channel or, if need be, exclude reading the acknowledgements on the control channel. Time ranges are then booked, ranges in which access to the shared resource is denied to the user in order to free it for priority tasks. If access is made according to the discrete ALOHA protocol, the booked time ranges can be transmission intervals.

It is also possible that a user has transmission requirements or a priority which justifies a temporary or permanent booking of part of the resource. The user with that privilege can then access the resource in the booked time ranges, the other users being excluded from any random access to these ranges.

In both the cases of booking explained above, all the users of the resource know beforehand the ranges they cannot access. These booked ranges interfere, however, with random access working and especially with the resolution of the dynamic persistence. Indeed, even for a relatively small density of booked ranges, the transmission/retransmission instants obtained through sampling of the random variables can fall, possibly in a repeated manner, inside these ranges. A user can then be tempted to stray from the values obtained by sampling of its random values. This, however, would introduce a bias which would modify in an uncontrolled way the statistical properties of access to the resource and, especially, would no longer guarantee that the systems gets quickly out of a situation with repeated collisions.

The object of this invention is to allow a check of the traffic and the resolution of dynamic persistence in systems with random access with booking of time ranges.

This object is achieved by a temporary modification of the random variables giving transmission/retransmission instants in random variables of the same mean but with a greater variance.

Advantageously, a breach of booking is established when the transmission instant of the data packet falls in a booked time range. But it can also be established when the acknowledgement of the data packet is expected in a booked time range.

The ALOHA protocol is advantageously a discrete ALOHA protocol and the booked time ranges are transmission intervals.

The features of the invention mentioned above, as well as others, will appear more clearly in reading the following description of an example of implementation, said description being made in connection with the enclosed drawings, amongst which:

Figure 3:
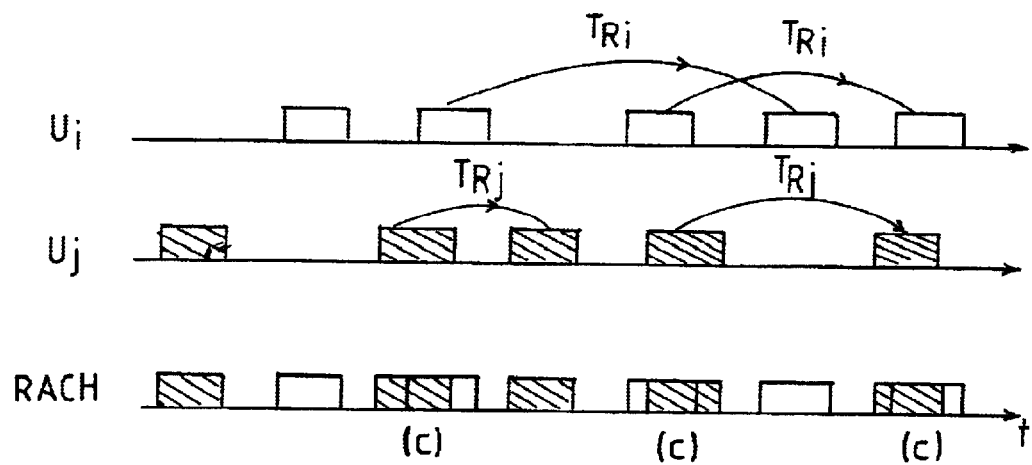
Figure 4:
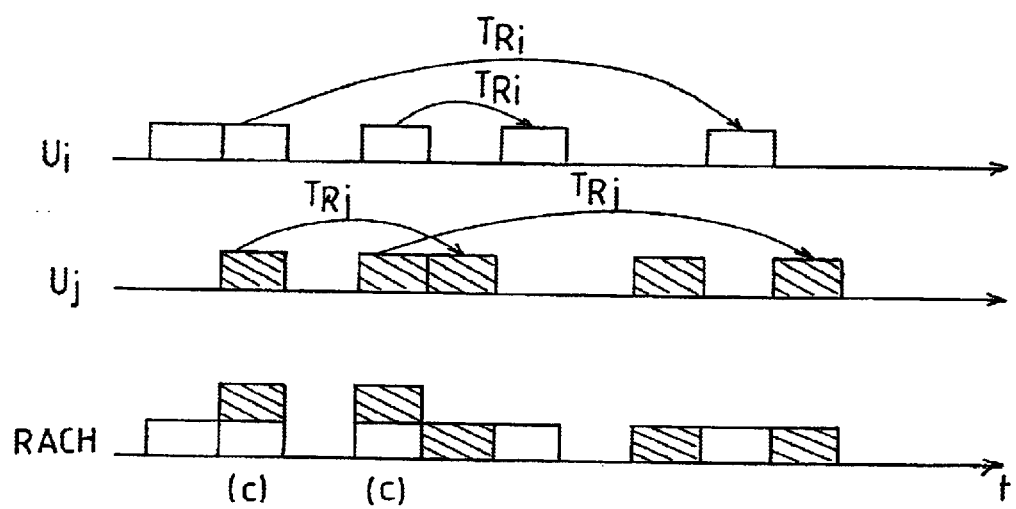
Figure 5:
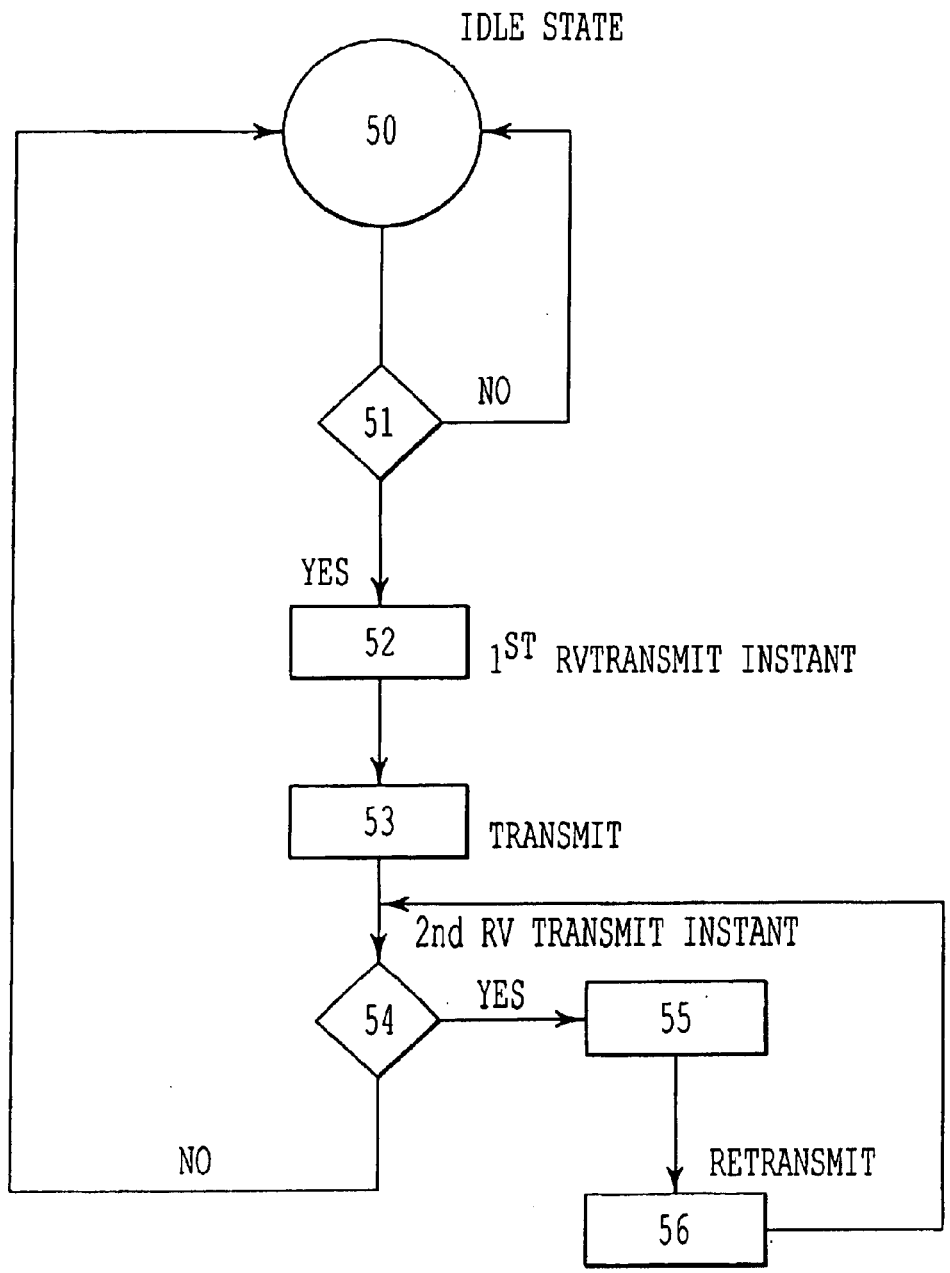
Figure 6:
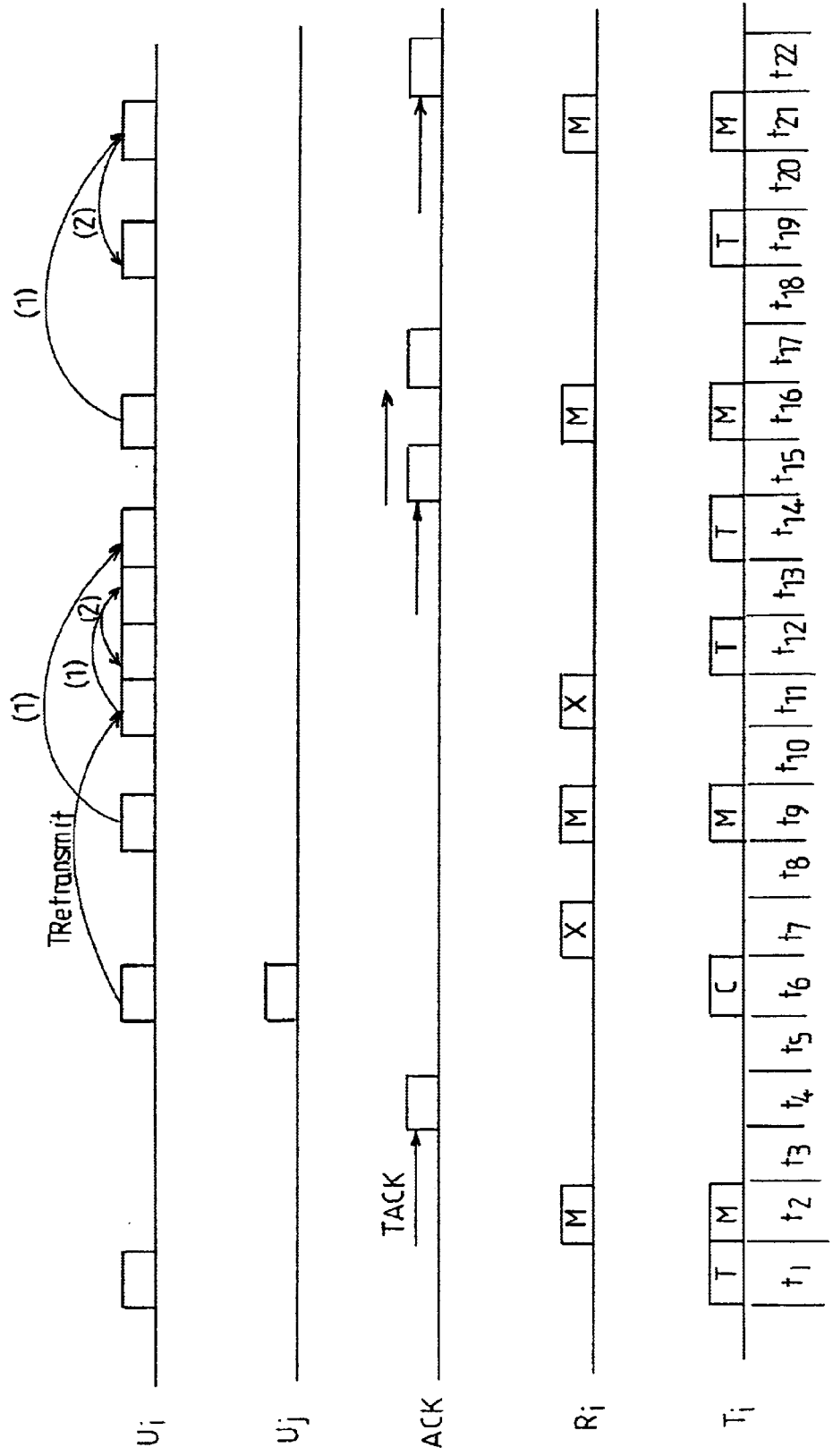
Figure 7:
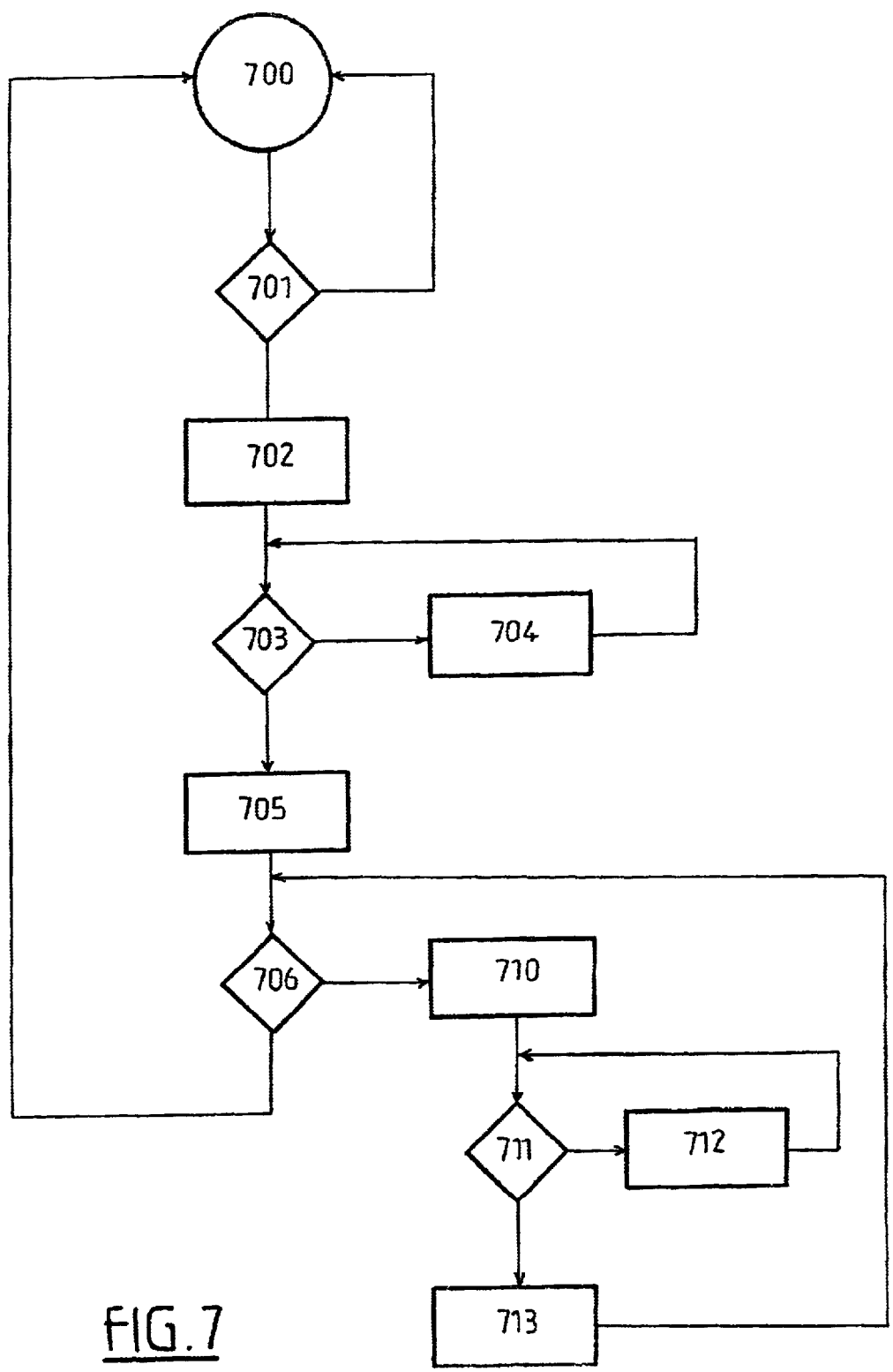

FIG. 3 represents a transmission sequence according to the purely random ALOHA protocol, FIG. 4 represents a transmission sequence according to the discrete ALOHA protocol, FIG. 5 represents a user operation flow chart according to a protocol of the ALOHA type, FIG. 6 represents a transmission sequence using a random access method according to the invention, FIG. 7 represents an operation flow chart of a user using a method of random access according to the invention.

Figure 1:
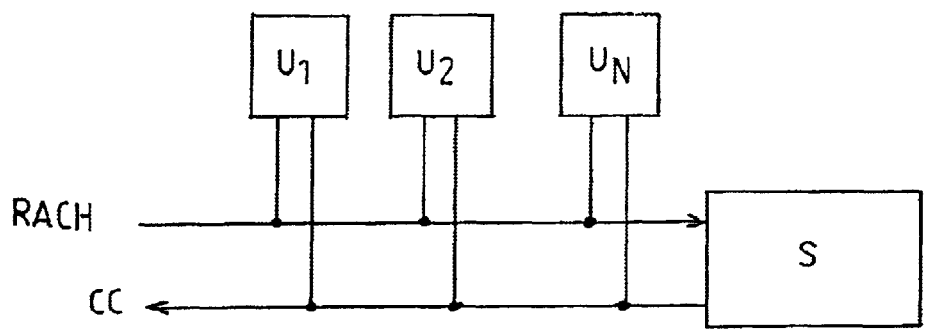
FIG. 1 represents the skeleton diagram of a system of random access to a resource shared between several users.
Figure 2:
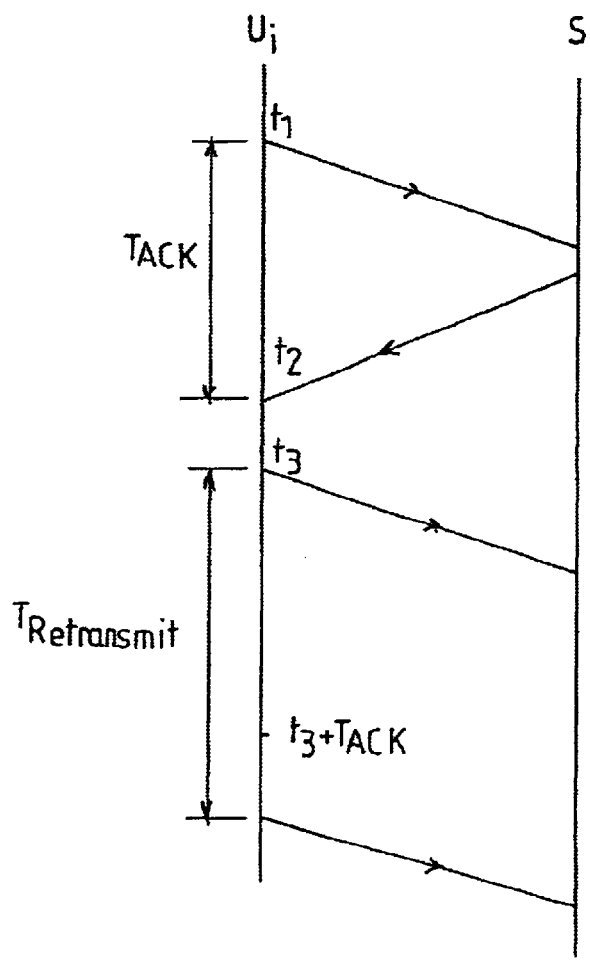
FIG. 2 represents a transmission timing chart in the system of FIG. 1.

We shall use again the hypothesis of a resource shared by several users as illustrated in FIG. 1 and already described. The users' access to the resource is made according to a random mode and in packets. Certain time ranges are booked for a given user, either because he has to carry out special tasks during these ranges (measurements on the network, for example), or because a privileged user has booked part of the resource. The booking can be temporary or definitive, but it will be assumed that each user knows in advance (or again receives through the system) the programme of the ranges during which he cannot access the resource.

FIG. 6 shows an example of a transmission sequence in the presence of booked ranges using a discrete ALOHA protocol, modified according to the invention. The booked ranges to be considered for user $U_i$ are given by line $R_i$: during the ranges marked (M), user $U_i$ must carry out priority tasks, during ranges marked (X), a privileged user forbids access to the resource. Line $U_i$ indicates attempts by user $U_i$ to transmit data packets. Line $U_j$ indicates the packets transmitted by user $U_j$ and line ACK the acknowledgements sent back by the control system on the control channel. The tasks carried out by user $U_i$ are shown on line $T_i$. The intervals marked (T) correspond to a transmission without collision, (C) to a transmission with collision, (M) to a priority task.

When a packet is to be transmitted, user $U_i$ assigns to it a transmission instant $T_{Transmit}$ supplied by its first random variable. There can then be two options: if the assigned instant is compatible with the booking, the packet is sent at this instant; if, on the other hand, the assigned instant is in breach of the booking, either because it falls within a booked range (X or M), or, because the corresponding acknowledgement would be received during the carrying out of a priority task (M), the packet cannot be transmitted at the assigned instant. Then one proceeds, according to the invention, to a temporary modification of the (first) random variable into a random variable of the same mean and greater variance. The unchanged mean ensures a control of the performances by the system and the greater variance makes it possible to reach values of transmission instant which no longer breach the booking. The modified random value supplies a new transmission instant which is tested again. If the new instant leads again to a breach, the modification step is iterated.

According to an advantageous embodiment, the modification is carried out by the addition of a random variable which is balanced and of a given law (discrete for discrete ALOHA and continuous for purely random ALOHA).

Taking up again the example of FIG. 6, the first random variable of $U_i$ having supplied a value of $t_{16}$ for the transmission of a packet and this instant being in breach of the booking (priority task (M)), the random variable is modified and a new sample is taken. The new instant obtained being again in breach of the booking for the same reason, the previous step is repeated. The obtained instant $t_{19}$ not being in breach of the booking, the packet is transmitted at that instant.

When the data packet is sent at a transmission instant compatible with the booking (possibly after modification of the first random variable as indicated above), it can nevertheless still be subject to collision. The collision is detected by the user, for example if no acknowledgement is received during a given time $T_{ACK}$. If the packet has been in collision, it is necessary to transmit it again at the end of a period of time $T_{Retransmit}$ after its first transmission, the delay $T_{Retransmit}$ being supplied by a second random variable. The retransmission instant thus obtained must be tested to verify its compatibility with the booking. If this is the case, the packet is transmitted again at the instant obtained; if not, one proceeds, according to the invention, to a temporary modification of the second random variable into a random variable of the same mean and greater variance. As mentioned above, if the new instant leads again to a breach, the modification step is iterated. The modification can be made in the same way by the addition of a random variable which is balanced and of a given law (discrete for discrete ALOHA and continuous for purely random ALOHA). Thus, each user retains an unaltered mean value of $T_{Retransmit}$ as initially set by the system. In particular, the mean values of the various users remain distinct, which reduces the dynamic persistence.

Taking up again the example of FIG. 6, the packet transmitted in $t_6$ having collided, a first delay $T_{Retransmit}$ is given by the second random variable of user $U_i$. The corresponding instant $t_{11}$ is in breach of the booking (range (X)). The random variable is then modified and a new sampling is carried out to obtain a delay value. The new transmission instant corresponding to this delay $t_{13}$ is also in breach of the booking because the acknowledgement would be expected at time $t_{16}$ booked for a priority task (range (M)). The random variable is therefore modified again. The delay obtained through this new sampling gives a transmission instant $t_{12}$ which is compatible with the booking.

Although the method according to the invention has been illustrated in FIG. 6 within the framework of a discrete ALOHA protocol, it is clear that it also applies to a purely random ALOHA protocol.

The operation of a user according to the method of the invention is given diagrammatically in the flow chart of FIG. 7.

Starting form the idle state (700), the user tests periodically (701) whether a data packet is to be transmitted. If this is the case, the first random variable of the user provides (702) a transmission instant $T_{Transmit}$. This value is tested (703) to verify its compatibility with the booking. In the negative case, the first random variable is modified (704) and the new transmission instant $T_{Transmit}$ obtained (704) is subjected again to the 3 compatibility test (703). In the contrary case, the user sends (705) at $T_{Transmit}$ the data packet on the shared resource and awaits the acknowledgment. If it is received (706), the user returns to its idle state. If not, it is concluded (706) that there is a collision and the second random variable (710) supplies a delay time $T_{Retransmit}$. The corresponding retransmission instant is tested (711) to check its compatibility with the booking. In the negative case, the second random variable is modified (712) and a new delay time is obtained (712). The corresponding transmission instant is in its turn subjected to the compatibility test (712). If the instant is compatible, the user sends the packet again (713) at this instant, then waits for the acknowledgement.

In the above description, the modification of the random variables is temporary. They can return to their initial law after a certain lapse of time or a certain number of samples, in order to ensure a minimal stationariness. The random variables have in a way an elastic variance according to the booking constraints.

What is claimed is:

1. A method of random access by a user to a shared resource according to a protocol of the ALOHA type in which certain time ranges of non-access to the shared resource have been the object of a prior booking, comprising:

temporarily modifying, when the instant of transmission of a data packet by the user being supplied by at least one first random variable would result in a breach of the booking, said at least one first random variable into a modified second random variable including a same mean and greater variance as the at least one first random variable.

2. A method of random access according to claim 1, wherein a booking breach is established when the instant of transmission of the data packet falls within a booked time range.

3. A method of random access according to claim 2, wherein the booking breach is also established when an acknowledgement of the data packet is expected within a booked time range.

4. A method of random access according to claim 2, wherein the ALOHA protocol is a discrete ALOHA protocol and the booked time ranges are transmission intervals.

5. A method of random access according to claim 1, wherein the first random variable supplies a first transmission instant and the first random variable is temporarily modified into the modified second random variable of the same mean and greater variance when transmission at the first transmission instant would result in a breach of the prior booking.

6. A method of random access according to claim 5, wherein the modifying the first random variable comprises adding a balanced random variable to the first random variable.

7. A method of random access according to claim 6, wherein, if the transmission instant supplied by the first random variable as modified is in breach of the prior booking, the adding the balanced random variable is iterated until the transmission instant supplied by the first random variable is compatible with the prior booking.

8. A method of random access according to claim 5, wherein the modified second random variable supplies a second transmission instant if the packet transmitted at the first instant is in a collision and the modified second random variable is temporarily modified into a modified third random variable of the same mean and greater variance as the at least one first random variable when transmission at the second transmission instant would result in a breach of the prior booking.

9. A method of random access according to claim 8, wherein the modifying the modified second random variable comprises adding a balanced random variable to the modified second random variable.

10. A method of random access according to claim 9, wherein if the transmission instant supplied by the modified second random variable as modified is in breach of the prior booking, the adding the balanced random variable is iterated until the transmission instant supplied by the modified second random variable is compatible with the prior booking.

11. A method of random access according to claim 1, wherein the user carries out a measurement in at least one of the booked time ranges.

12. A method of random access according to claim 1, wherein the user is a mobile station.

* * * * *